(12) United States Patent
Vargas

(10) Patent No.: US 10,234,141 B2
(45) Date of Patent: Mar. 19, 2019

(54) CERAMIC AND CERAMIC MATRIX COMPOSITE ATTACHMENT METHODS AND SYSTEMS

(71) Applicant: United Technologies Corporation, Farmington, CT (US)

(72) Inventor: Chris Vargas, West Hartford, CT (US)

(73) Assignee: United Technoloigies Corporation, Farmington, CT (US)

( * ) Notice: Subject to any disclaimer, the term of this patent is extended or adjusted under 35 U.S.C. 154(b) by 327 days.

(21) Appl. No.: 15/140,911

(22) Filed: Apr. 28, 2016

(65) Prior Publication Data

US 2017/0314785 A1    Nov. 2, 2017

(51) Int. Cl.
| | | |
|---|---|---|
| *F02G 3/00* | (2006.01) | |
| *F23R 3/00* | (2006.01) | |
| *F01D 11/08* | (2006.01) | |
| *F01D 25/00* | (2006.01) | |
| *F01D 25/30* | (2006.01) | |

(Continued)

(52) U.S. Cl.
CPC .............. *F23R 3/007* (2013.01); *F01D 11/08* (2013.01); *F01D 25/005* (2013.01); *F01D 25/24* (2013.01); *F01D 25/28* (2013.01); *F01D 25/30* (2013.01); *F16B 37/048* (2013.01); *F23R 3/60* (2013.01); *F05D 2220/32* (2013.01); *F05D 2230/20* (2013.01); *F05D 2230/31* (2013.01); *F05D 2230/60* (2013.01); *F05D 2240/35* (2013.01); *F05D 2260/30* (2013.01); *F05D 2300/6033* (2013.01); *F16B 5/0642* (2013.01); *F23R 2900/00018* (2013.01)

(58) Field of Classification Search
CPC ........ F01D 11/08; F01D 25/005; F01D 25/30; F05D 2220/32; F05D 2230/20; F05D 2230/31; F05D 2230/60; F05D 2260/30; F05D 2300/6033; F23R 3/007; B21J 15/06; F16B 19/12; Y10T 29/49806; Y10T 29/49805; Y10T 29/49938; Y10T 29/49956
See application file for complete search history.

(56) References Cited

U.S. PATENT DOCUMENTS 1,956,623 A * 5/1934 Pleister ............... F16B 13/0808
411/346
2,013,503 A * 9/1935 Pleister ............... F16B 13/0808
411/346

(Continued)

FOREIGN PATENT DOCUMENTS

| EP | 0298892 A1 | 1/1989 |
| EP | 2682245 A2 | 1/2014 |
| WO | 2014187659 A1 | 11/2014 |

OTHER PUBLICATIONS

European Search Report dated Oct. 4, 2017 for European Patent Application No. 17168819.5.

*Primary Examiner* — Jesse S Bogue
(74) *Attorney, Agent, or Firm* — Bachman & LaPointe, P.C.

(57) ABSTRACT

Attaching a fastener to a ceramic matrix composite or ceramic body by inserting a portion of the fastener into a compartment of the body, the compartment having a first portion and a second portion, the second portion outboard of and narrower than the first portion; and delivering a fluid into the fastener to expand a portion of the fastener within the blind compartment first portion.

17 Claims, 9 Drawing Sheets

(51) Int. Cl.
*F01D 25/24* (2006.01)
*F01D 25/28* (2006.01)
*F16B 37/04* (2006.01)
*F23R 3/60* (2006.01)
*F16B 5/06* (2006.01)

(56) References Cited

U.S. PATENT DOCUMENTS

| | | | | |
|---|---|---|---|---|
| 2,061,634 A * | 11/1936 | Pleister | | F16B 13/0808 411/342 |
| 2,342,732 A * | 2/1944 | Austin | | F16B 19/12 29/512 |
| 2,359,629 A * | 10/1944 | Dexter | | F16B 19/12 29/421.1 |
| 2,421,769 A * | 6/1947 | Wolfe | | F16B 19/12 29/421.2 |
| 2,445,803 A * | 7/1948 | Rogers | | F16B 19/12 29/421.1 |
| 2,492,605 A * | 12/1949 | Varney | | F16B 19/12 411/19 |
| 2,535,079 A * | 12/1950 | Lebert | | F16B 19/12 29/421.1 |
| 2,543,063 A * | 2/1951 | Rogers | | B21K 1/60 29/421.1 |
| 2,562,721 A * | 7/1951 | Jakosky | | F16B 19/12 29/421.1 |
| 2,562,724 A * | 7/1951 | Lebert | | F16B 19/12 29/509 |
| 3,520,225 A * | 7/1970 | Baugh | | F16B 19/12 411/19 |
| 4,609,136 A * | 9/1986 | Hara | | B21J 15/32 227/120 |
| 6,301,766 B1 * | 10/2001 | Kolle | | B21C 23/007 29/421.1 |
| 7,832,972 B2 | 11/2010 | Jarmon | | |
| 7,926,286 B2 * | 4/2011 | Morenko | | F02C 3/145 60/739 |
| 7,954,327 B2 * | 6/2011 | Pieussergues | | F23R 3/002 60/752 |
| 8,505,306 B2 | 8/2013 | Dierberger et al. | | |
| 8,607,577 B2 | 12/2013 | Ruberte Sanchez et al. | | |
| 8,800,293 B2 | 8/2014 | Dierberger et al. | | |
| 9,003,633 B1 * | 4/2015 | Difante | | B25B 21/002 29/525.02 |
| 2008/0080949 A1 * | 4/2008 | Deng | | F16B 13/0808 411/342 |
| 2009/0226279 A1 | 9/2009 | Jarmon | | |
| 2015/0059346 A1 * | 3/2015 | Bunel | | F23R 3/14 60/737 |
| 2016/0109129 A1 | 4/2016 | Rettig | | |
| 2016/0351085 A1 * | 12/2016 | Johnston | | G09F 3/12 |

* cited by examiner

CERAMIC AND CERAMIC MATRIX COMPOSITE ATTACHMENT METHODS AND SYSTEMS

BACKGROUND

The disclosure relates to aerospace propulsion. More particularly, the disclosure relates to mounting of ceramic and ceramic matrix composite (CMC) structures in engines.

The mounting of ceramic and ceramic matrix composite parts in the hot sections of gas turbine engines has involved a variety of difficulties. These have included a number of issues involving differential thermal expansion of the metallic and non-metallic components involved.

In some situations, metallic fasteners pass entirely through the non-metallic component. One example is as seen in U.S. Pat. No. 8,607,577, of Ruberte Sanchez et al., Dec. 17, 2013, the disclosure of which is incorporated in its entirety herein as if set forth at length.

U.S. Pat. No. 7,832,972, of Jarmon, Nov. 16, 2010, discloses a system involving slotting the non-metallic panel and inserting the asymmetric heads of fasteners followed by rotating the fasteners to backlock the heads. The disclosure of U.S. Pat. No. 7,832,972 is incorporated in its entirety herein as if set forth at length.

SUMMARY

One aspect of the disclosure involves a method for attaching a fastener to a ceramic matrix composite or ceramic body. The method comprises: inserting a portion of the fastener into a compartment of the body, the compartment having a first portion and a second portion, the second portion outboard of and narrower than the first portion; and delivering a fluid into the fastener to expand a portion of the fastener within the compartment first portion.

A further embodiment may additionally and/or alternatively include the compartment being a blind compartment.

A further embodiment may additionally and/or alternatively include the fastener having a threaded shank and the method comprising engaging a fluid source to the shank before the delivering and disengaging the fluid source from the shank after the delivering.

A further embodiment may additionally and/or alternatively include heating a portion of the fastener (e.g., optionally in situ to soften to facilitate the deforming).

A further embodiment may additionally and/or alternatively include forming the compartment by laterally shifting a rotating bit, the rotating bit having a protuberant cutting or grinding portion that forms the compartment first portion. This may be after forming an initial compartment precursor (e.g., bore) such as by drilling.

A further embodiment may additionally and/or alternatively include the lateral shifting comprising a circular shift (e.g., after an initial radial shift).

A further embodiment may additionally and/or alternatively include manufacturing the fastener via metal injection molding or additive manufacture.

A further embodiment may additionally and/or alternatively include the fastener expanded portion and shank being a single piece.

Another aspect of the disclosure involves a panel assembly comprising a ceramic matrix composite or ceramic body, the body having a compartment, the compartment having a first portion and a second portion, the second portion outboard of and narrower than the first portion. A fastener has an expanded portion within the compartment first portion.

A further embodiment may additionally and/or alternatively include the compartment being a compartment.

A further embodiment may additionally and/or alternatively include the expanded portion being hollow.

A further embodiment may additionally and/or alternatively include the expanded portion interior being continuous with a hollow portion of the shank.

A further embodiment may additionally and/or alternatively include the body being shaped as a segment of a frustoconical shell.

A further embodiment may additionally and/or alternatively include the fastener having a threaded shank.

A further embodiment may additionally and/or alternatively include the panel being in combination with a mounting structure, the threaded shank passing through a hole in the mounting structure and held by a nut.

A further embodiment may additionally and/or alternatively include a gas turbine engine comprising the panel.

A further embodiment may additionally and/or alternatively include the panel being along a gaspath of the gas turbine engine.

A further embodiment may additionally and/or alternatively include the panel the panel being selected from the group consisting of combustor panels, blade outer air seals, and exhaust nozzle liners The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
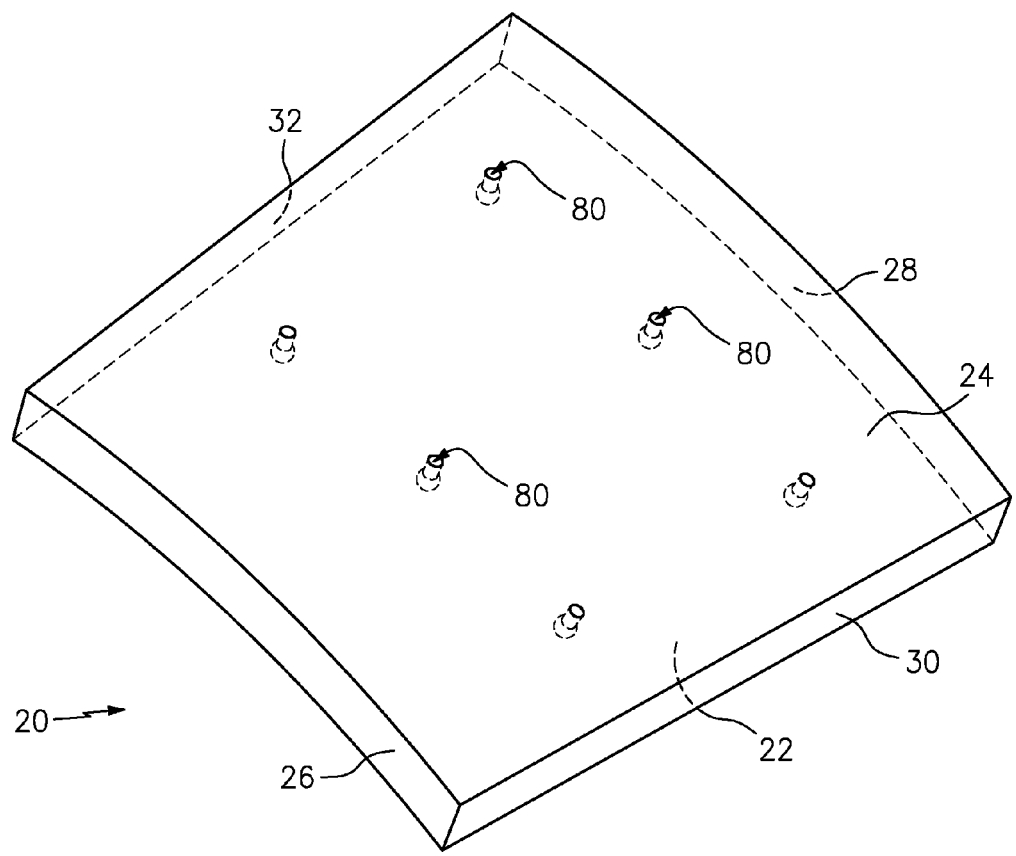
FIG. 1 is a view of a gas turbine engine panel.

FIG. 1 shows a panel 20. The exemplary panel 20 comprises a ceramic or ceramic matrix composite (CMC) body having a first face 22 and a second face 24. The exemplary first face 22 is a gaspath-facing face in a gas turbine engine (broadly inclusive of engines used in propulsion via thrust, other propulsive engines, industrial gas turbines, and the like). Particular applications include combustor panel liners (including as segments thereof), blade outer air seals (BOAS), exhaust nozzle flap liners, and the like. Other applications include ramjet and rocket engine use, aerodynamic thermal tiles, and the like.

In a typical combustor panel application, BOAS, or flap liner, the panel is generally a frustoconical segment with a leading end/edge 26, a trailing end/edge 28, a first lateral end/edge 30, and a second lateral end/edge 32. In an annular combustor, there may be a longitudinal end-to-end plurality of annular lateral end-to-end arrays of such panels.

The second face 24 (backside) faces, and may in some implementations contact, an adjacent surface 40 of mounting structure 42. Typically, the mounting structure 42 will be metallic such as a portion of an engine case or a metallic panel carrier structure. As is discussed below, the panel 20 is mounted to the mounting structure via a fastening system. The exemplary fasteners 50 are threaded fasteners having a shank or shaft 52 extending to an end 54 and bearing, along at least a portion, an external thread 56. In the installed condition, the threaded shank is received by a complementary internally-threaded member 60 such as a nut along a backside surface 44 of the mounting structure with the shank passing through a hole 62. Various washers 63, and the like, may also be used.

Figure 2:
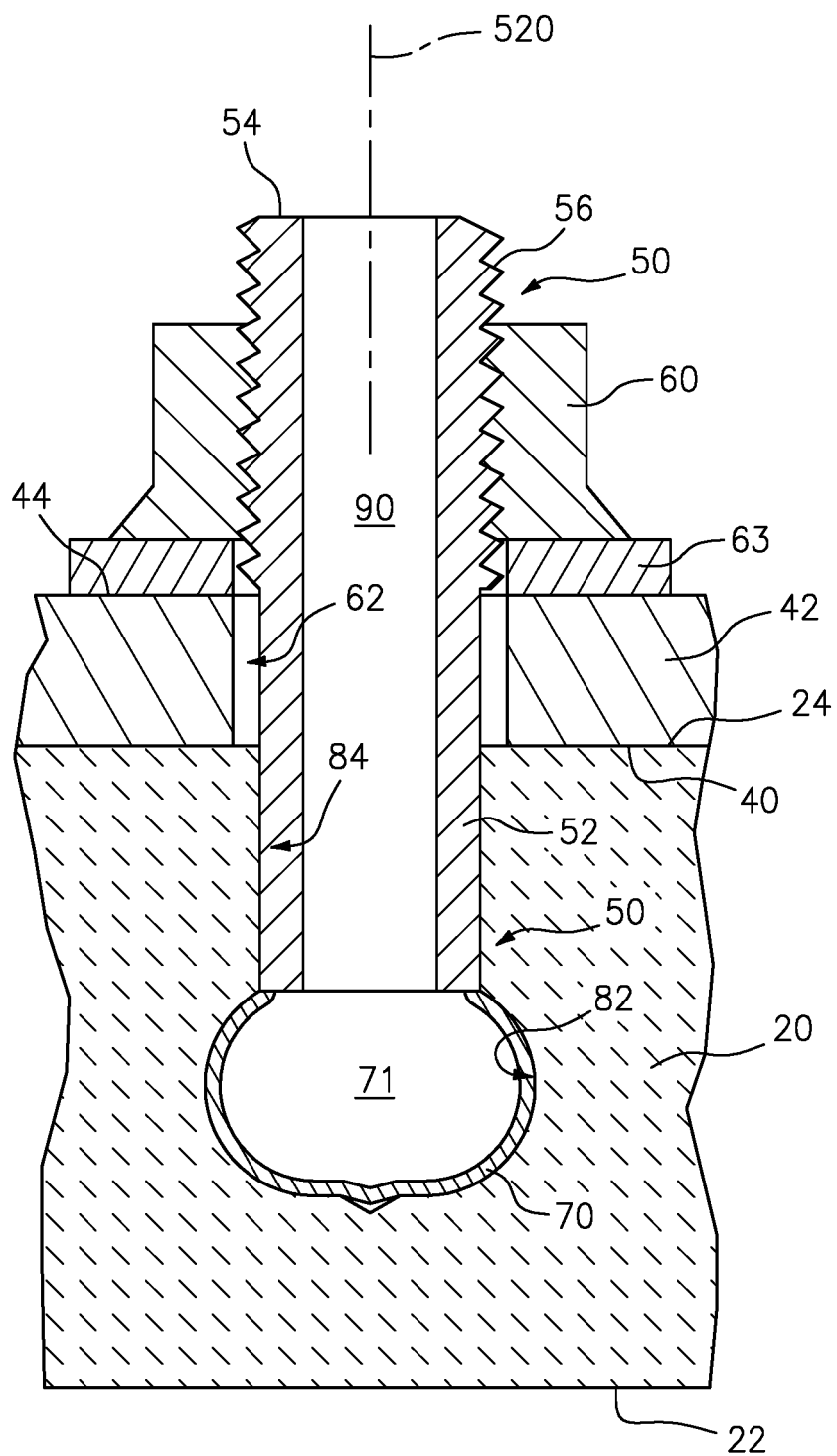
FIG. 2 is a radial sectional view of an assembly of the panel and fasteners mounted to mounting structure in a gas turbine engine.

The fastener 50 has a head 70 (shown as a protuberant head) at one end of the shank captured in a compartment (e.g., a blind compartment) 80 (FIG. 1) open to the backside 24 so that the shank protrudes from the backside. To backlock the head 70, the compartment has a first portion 82 (FIG. 2) receiving the protuberance of the head and a narrower second portion 84, the second portion outboard of the first portion. As is discussed below, the fastener head protuberance results from an in situ deformation.

Figure 3:
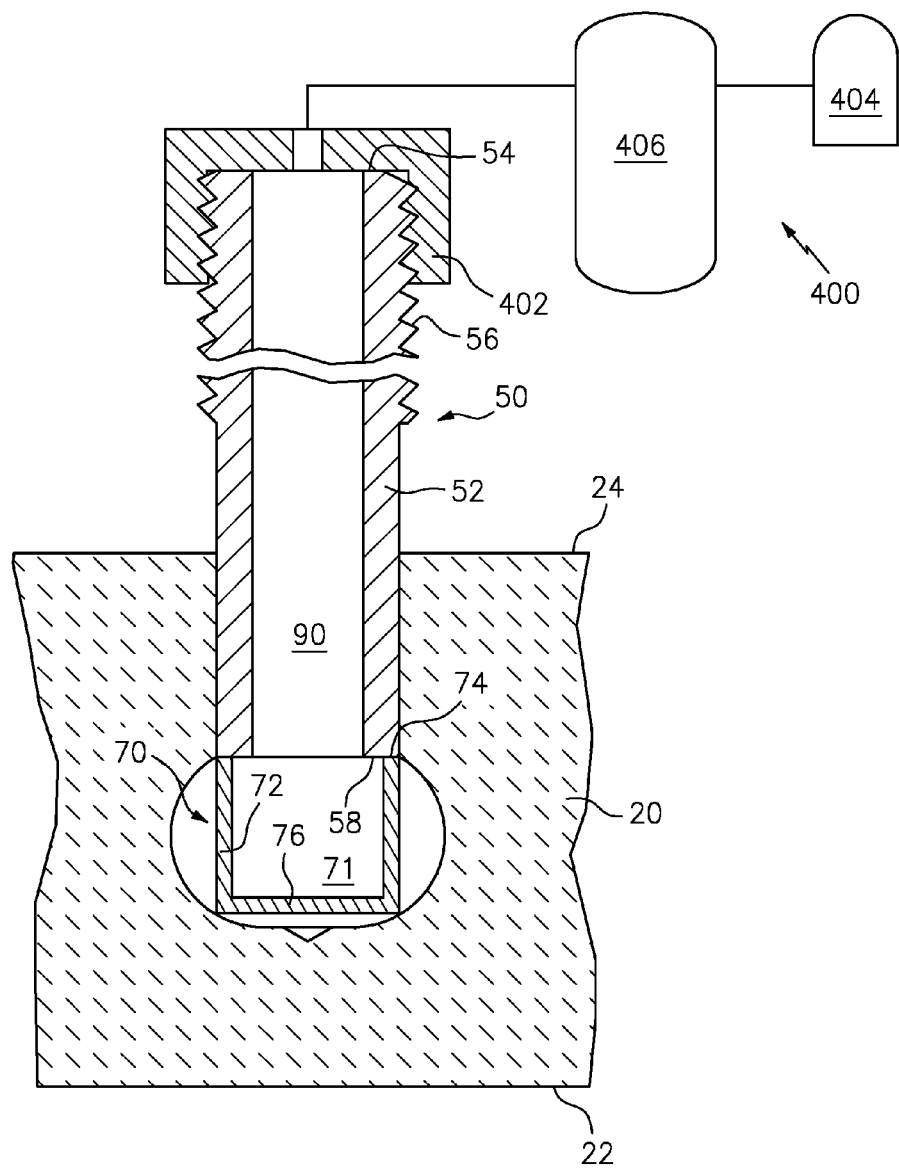
FIG. 3 is a radial sectional view of the panel during securing of the fasteners in compartments in the panel.

In an exemplary embodiment, the fastener 50 is initially formed with the head 70 in an at least relatively non-protuberant condition and then the head 70 is expanded. FIG. 3 shows the fastener in this initial condition. The shank 52 and head 70 are hollow. In various embodiments, the head 70 and shank 52 are separately formed and then joined. For example, the shank 52 may be formed from threading and machining tubular stock or from rod stock with a passageway 90 drilled between ends 54 and 58. The head 70 may be machined or stamped in a cup-like form having a sidewall 72 with a rim 74 at one end and a transverse web 76 at the other end. The head 70 and shank 52 may then be attached to each other such as via welding or brazing the rim 74 to the end 58 to form a weld or braze joint.

Figure 9:
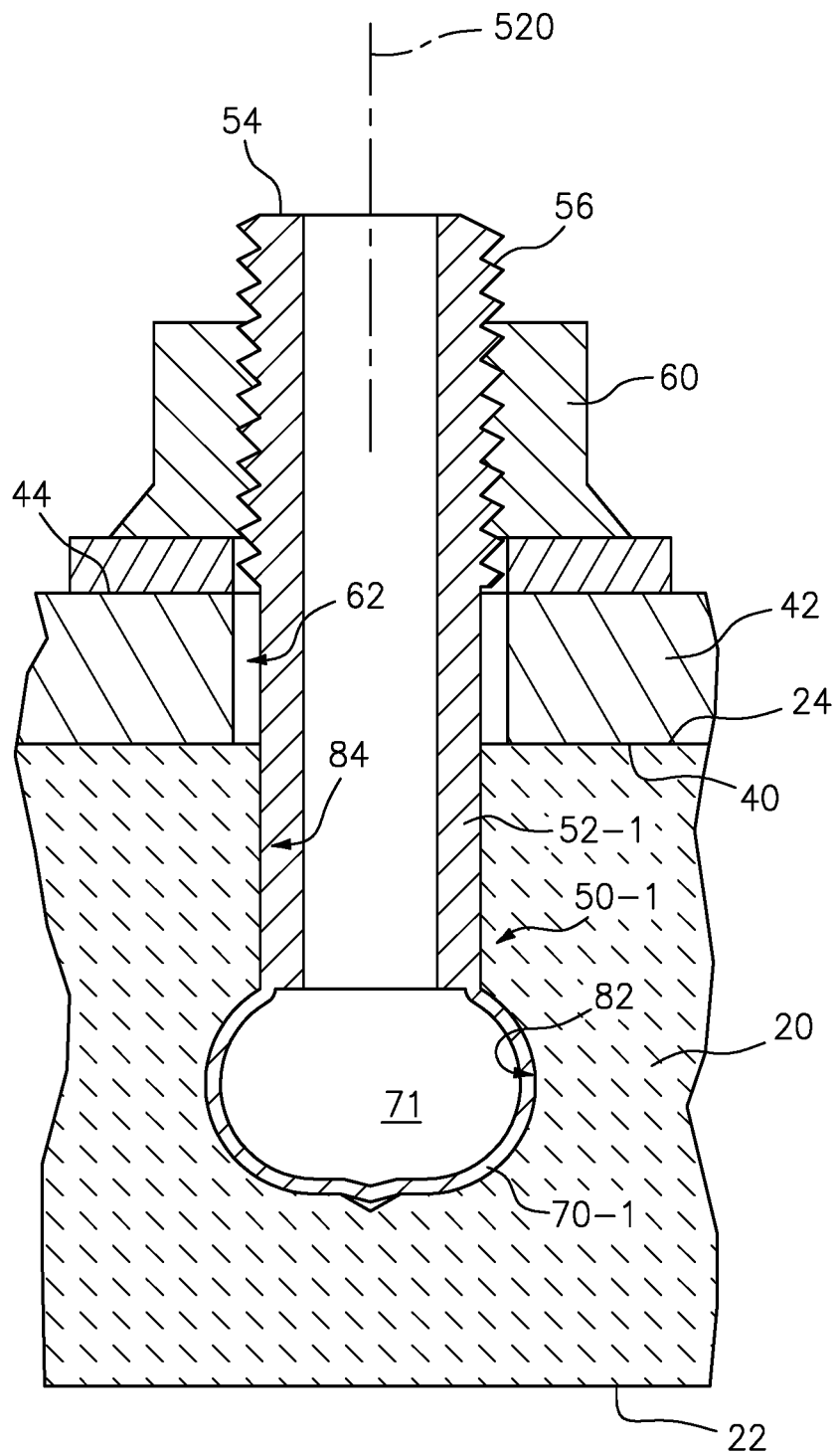
FIG. 9 is a radial sectional view of an assembly of the panel and alternate fasteners mounted to mounting structure in a gas turbine engine.

Alternative techniques may manufacture the fastener in a single piece unitary structure such as metal injection molding (powder metallurgical (PM)), casting, or additive manufacturing. FIG. 9 shows such a single-piece fastener 50-1 with a head 70-1 in its expanded condition relative to the shank 52-1. Exemplary fastener materials for any of these embodiments include nickel-based superalloys. Exemplary alloys include IN625, IN718, IN617, Waspalloy™, and Haynes™ 230 and 282.

The unexpanded head 70, 70-1 may then be inserted into the compartment 80. A source 400 of pressurized fluid may then (or already) be connected to the fastener such as by attaching a fitting 402 to the shank 52, 52-1 (e.g., threading a threaded fitting or applying a quick release fitting). An exemplary source 400 is a high pressure gas source (e.g., having a compressor 404 and a storage tank 406). Other systems include hydraulic systems using liquid fluid. High pressure fluid is then delivered from the source 400 to the fastener 50, 50-1 (e.g., via opening a valve), pressurizing the head interior 71 and causing an at least partial plastic deformation to create the protuberance or sufficiently increase the protuberance of the head 70, 70-1 to backlock the fastener 50, 50-1 in the panel. The source 400 may then be disengaged (e.g., closing valve and unscrewing the fitting from the shank), leaving the head 70, 70-1 deformed and protuberant to hold the fastener 50, 50-1 against extraction. To facilitate the plastic deformation, the fastener 50, 50-1 may be heated (via gas torch or oven (not shown)) prior to expansion and then cooled. Other methods of heating the fastener 50, 50-1 are induction (selectively heats the metal relative to non-conductive ceramic and CMCs) or IR to locally heat the ceramic from surface 22, which then heats the metal via conduction.

The process may be repeated for multiple fasteners 50, 50-1 on a given panel 20.

The panel 20 may then be installed by engaging the shank(s) 72, 72-1 with the associated holes 62 and installing the washer(s) 63 and installing/tightening the nut(s) 60. During nut tightening, the shank 72, 72-1 may be held against rotation by a respective wrench or key (e.g., hex key (not shown)) holding an end portion of the shank (e.g., respectively externally faceted or internally faceted).

Figure 4:
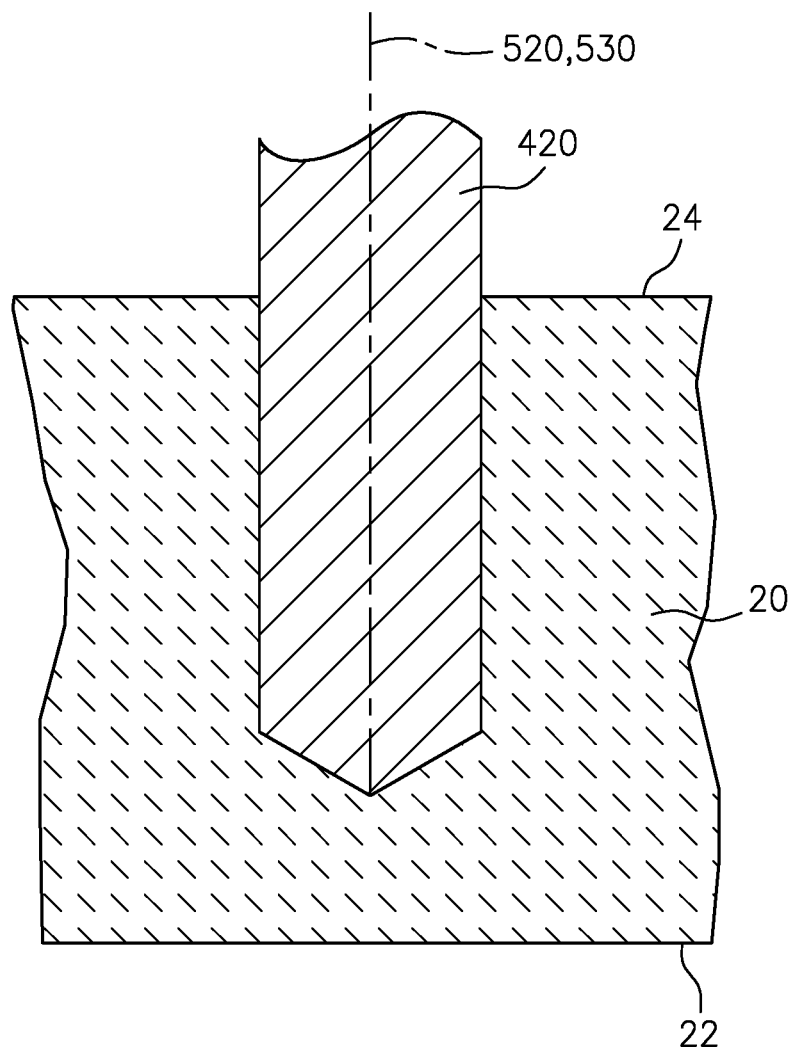
FIG. 4 is a radial sectional view of the panel during compartment drilling.
Figure 5:
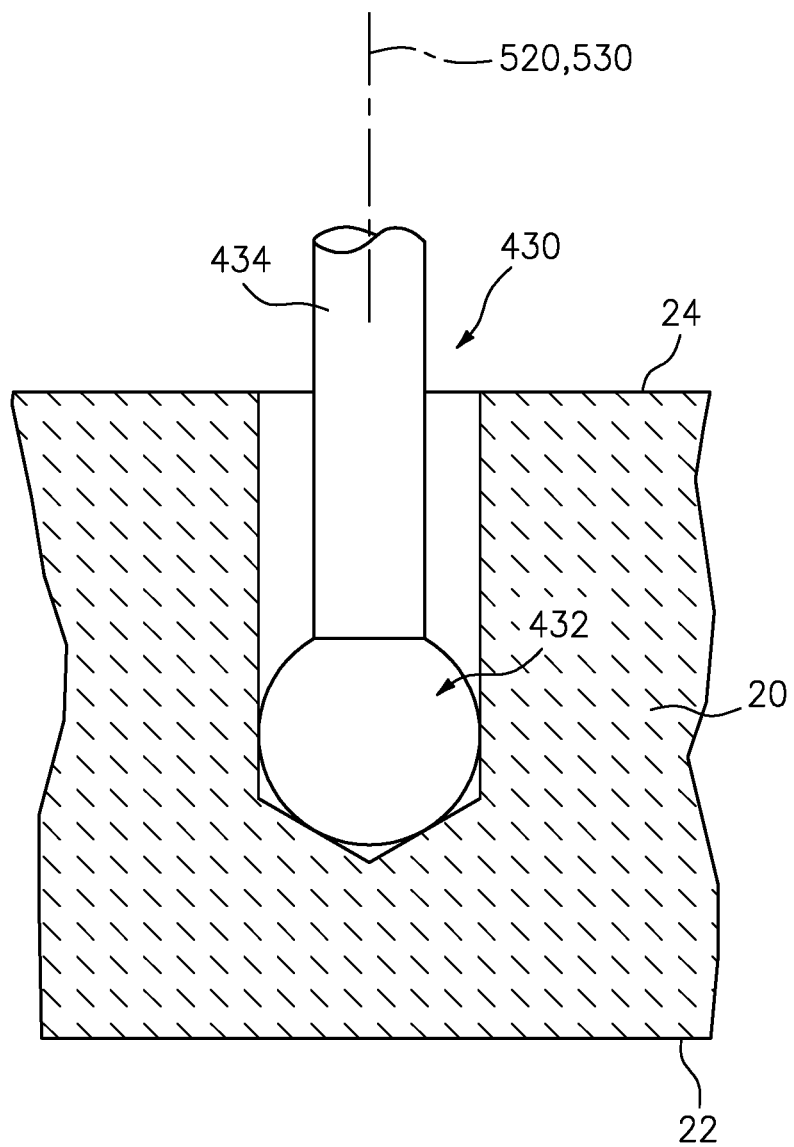
FIG. 5 is a radial sectional view of the panel upon insertion of a grinding or machining bit.
Figure 6:
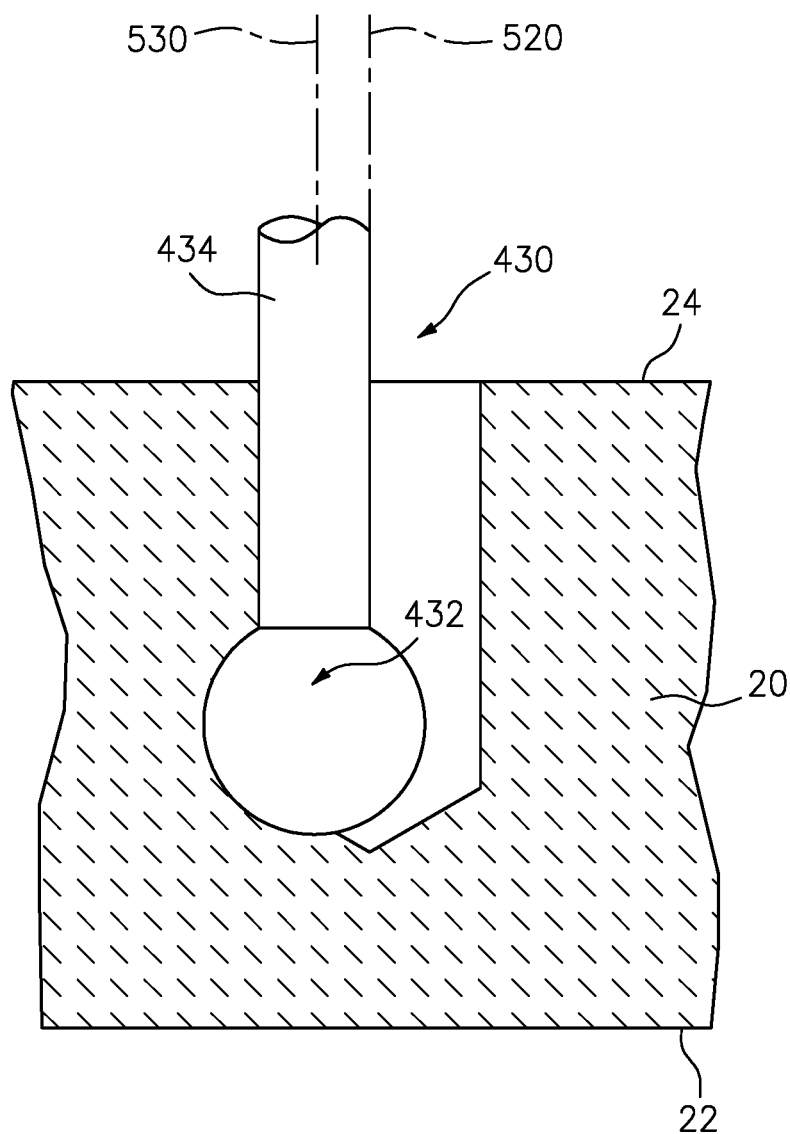
FIG. 6 is a radial sectional view of the panel after a transverse shift of the bit.
Figure 7:
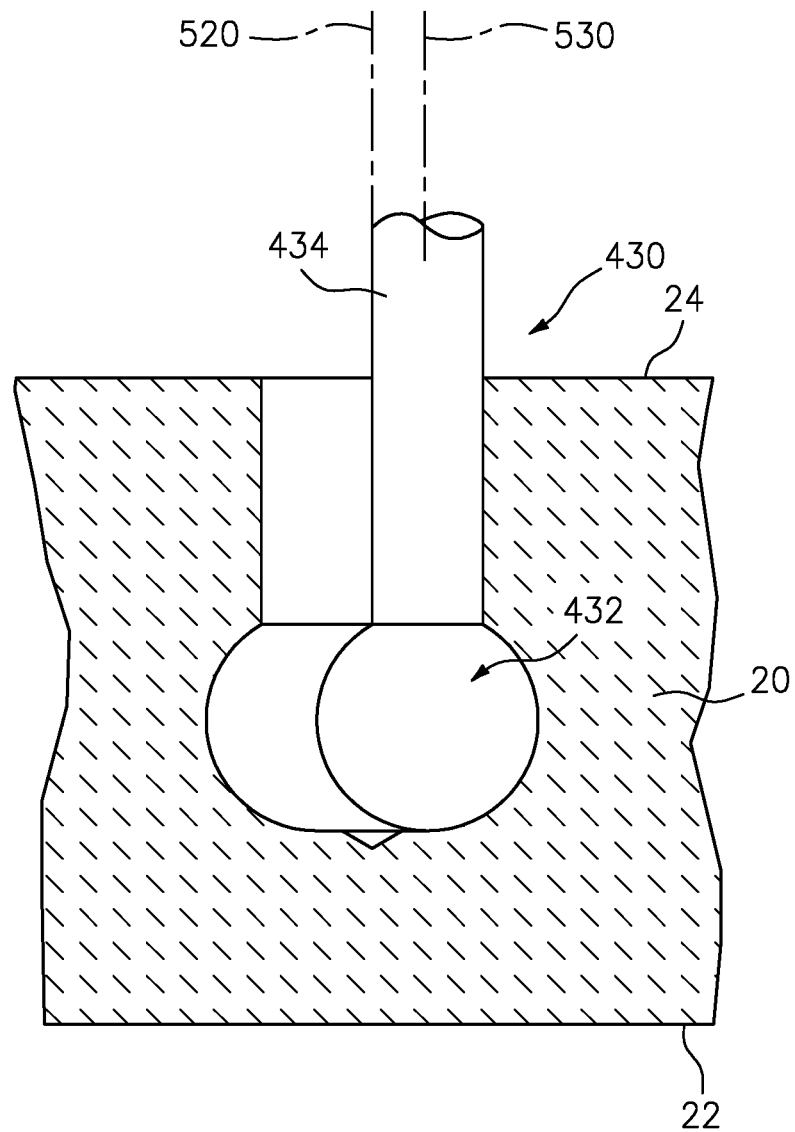
FIG. 7 is a radial sectional view of the panel during an orbiting of the bit.
Figure 8:
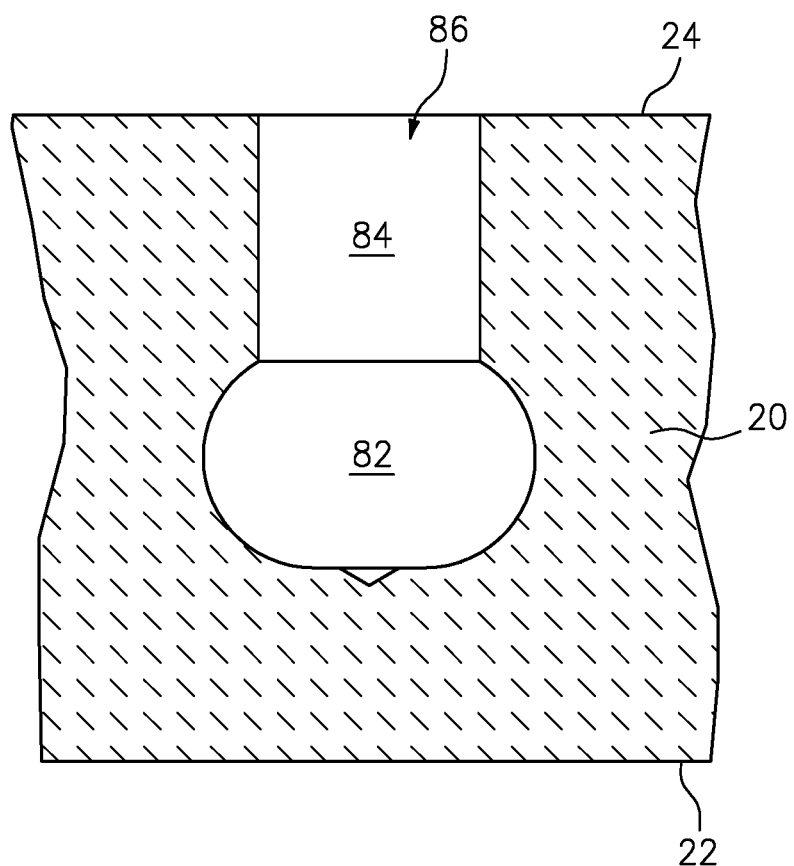
FIG. 8 is a radial sectional view of the panel after compartment formation.

A number of processes may be used to form the compartments 80. In various embodiments, the compartments may be pre-formed such as by molding the ceramic over sacrificial cores having the compartment shape and then chemically or thermally removing the cores. Such cores may also be used when forming a CMC. In another embodiment the compartments 80 are machined into a precursor of the panel 20. Several possible machining techniques may be used. One group involves first drilling (drill 420 with axis of rotation 530 of FIG. 4) a straight blind bore of a given diameter (e.g., just large enough to pass the shank 72, 72-1 and head 70, 70-1 pre-deformation) and having an axis 520. This step may effectively form the second portion 82. The portion 80 may then be formed by inserting a bit (430 of FIG. 5) with a protuberant cutting or grinding portion 432. The bit 430 may be inserted with the protuberant cutting or grinding portion 432 just being accommodated by the initial bore. The bit may be shifted radially outward relative to the axis 520 of the bore until the narrow shaft 434 of the bit 430 contacts or nears the bore surface. The rotating bit 430 may then be orbited (180° completed of 360° in FIG. 7) around the bore axis 520 to complete the machining of the first portion 80. The bit 430 may then be re-centered coaxial with the bore and withdrawn, leaving the compartment 80 with the enlarged first portion 82 (FIG. 8).

The system may have one or more of several advantages. In several advantages, the head of the fastener is not exposed to the gaspath. This reduces heating of the fastener and helps maintain its integrity. In certain situations such as nozzle flaps, it may reduce RADAR or infrared (IR) signature. There may be reduced likelihood of vibrating loose. Depending upon the nature of the alternative fastener, this may also involve reduce likelihood of the fastener becoming dislodged and potentially damaging other components.

Although panels are illustrated, other examples include those panels and other structures disclosed in the aforementioned Ruberte Sanchez and Jarmon patents. Non-panel situations may include, for example, the mounting of vane clusters.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

Where a measure is given in English units followed by a parenthetical containing SI or other units, the parenthetical's units are a conversion and should not imply a degree of precision not found in the English units.

One or more embodiments have been described. Nevertheless, it will be understood that various modifications may be made. For example, when applied to an existing baseline configuration, details of such baseline may influence details of particular implementations. Accordingly, other embodiments are within the scope of the following claims.

What is claimed is:

1. A method for mounting attaching a ceramic matrix composite or ceramic body, the method comprising:
    attaching a fastener to the ceramic matrix composite or ceramic body by:
        inserting a portion of the fastener into a compartment of the body, the compartment having a first portion and a second portion, the second portion outboard of and narrower than the first portion; and
        delivering a fluid into the fastener to expand a portion of the fastener within the compartment first portion;
    passing a threaded shank of the fastener through a hole in a mounting structure; and
    installing and tightening a nut to the shank.

2. The method of claim 1 wherein:
    the compartment is a blind compartment.

3. The method of claim 1 wherein:
    the method comprises engaging a fluid source to the shank before the delivering and disengaging the fluid source from the shank after the delivering.

4. The method of claim 1 further comprising:
    heating a portion of the fastener.

5. The method of claim 1 further comprising forming the blind compartment by:
    laterally shifting a rotating bit, the rotating bit having a protuberant cutting or grinding portion that forms the blind compartment first portion.

6. The method of claim 5 wherein the forming the blind compartment further comprises:
    forming an initial bore.

7. The method of claim 5 wherein:
    the lateral shifting comprises a circular shift.

8. The method of claim 1 wherein:
    the body is a combustor panel body.

9. The method of claim 4 wherein:
    the heating is induction heating that selectively heats the metal relative to the ceramic matrix composite or ceramic body.

10. The method of claim 4 wherein:
    the heating is infrared heating that locally heats a surface of the ceramic matrix composite or ceramic body opposite the fastener so that the ceramic matrix composite or ceramic body, then heats the fastener via conduction.

11. A mounted panel assembly comprising:
    a mounting structure having a hole in the mounting structure;
    a ceramic matrix composite or ceramic body, the body having a compartment, the compartment having a first portion and a second portion, the second portion outboard of and narrower than the first portion; and
    a fastener having:
        an expanded portion deformed to protuberance within the compartment first portion; and
        a threaded shank passing through the hole in the mounting structure and held by a nut.

12. The panel assembly of claim 11 wherein:
    the compartment is a blind compartment.

13. The panel assembly of claim 11 wherein:
    the expanded portion is hollow.

14. The panel assembly of claim 13 wherein:
    the expanded portion interior is continuous with a hollow portion of the shank.

15. The panel assembly of claim 11 wherein:
    the body is shaped as a segment of a frustoconical shell.

16. A gas turbine engine comprising the panel assembly of claim 11 wherein:
    the panel is along a gaspath of the gas turbine engine.

17. The gas turbine engine of claim 16 wherein:
    the panel is selected from the group consisting of combustor panels, blade outer air seals, and exhaust nozzle liners.

* * * * *